Patented Feb. 16, 1932

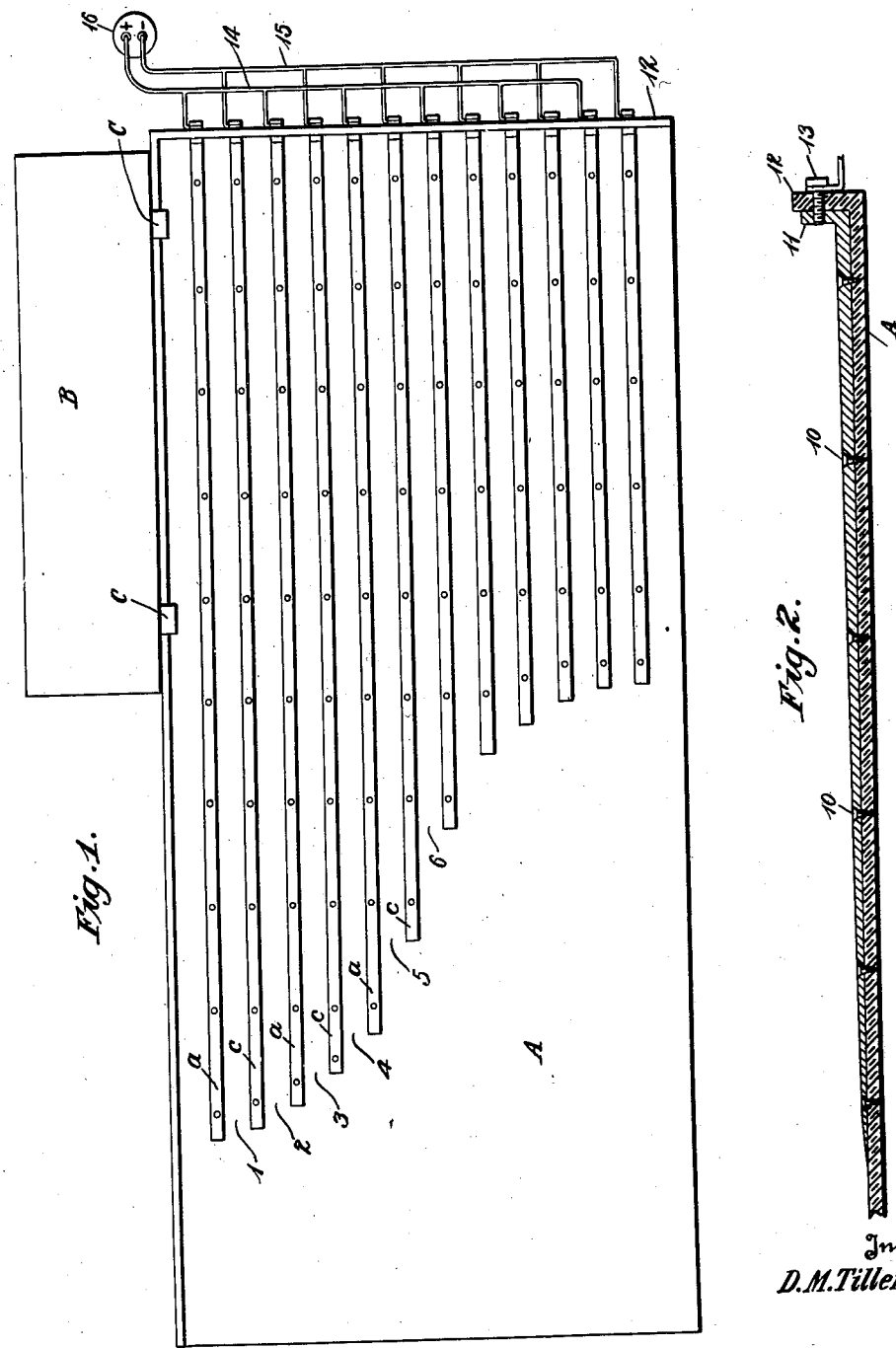

1,845,366

UNITED STATES PATENT OFFICE

DAVID M. TILLER, OF DENVER, COLORADO, ASSIGNOR OF ONE-FOURTH TO W. C. ANDERSON, OF DENVER, COLORADO, AND ONE-FOURTH TO N. J. SHARP, OF DENVER, COLORADO

SEPARATING PROCESS AND APPARATUS

Application filed May 14, 1930. Serial No. 452,386.

The invention is based essentially upon the properties possessed by aluminum hydroxide, when introduced to a liquid, of settling through the liquid and carrying down substances contained therein in admixture, in suspension and even in solution. By the utilization of this property of aluminum hydroxide, substances or solids whether naturally or artificially contained in the liquid or suspended or dissolved therein may be precipitated and the precipitates thus produced settle in stratas according to their respective specific gravities; or, when the treatment is effected on a concentrating table, the precipitates separate in sequence in accordance with their respective specific gravities.

Known processes for the production of aluminum hydroxide are so cumbersome and costly as to prohibit the use thereof as a settling agent in the treatment of liquids and it is accordingly an object of the present invention to provide a separation process of the character referred to and involving the application of the aforesaid properties of aluminum hydroxide which compound is produced in the process in such quantities, with such rapidity, and at such low cost as to make its use as a settling agent thoroughly practical and commercially feasible.

It is a further object of my invention to provide a concentrating table top for the separation of metals from their ores by the wet method, which apparatus permits of the formation of aluminum hydroxide within the liquid in which the materials undergoing treatment float.

Other objects and advantages of my invention will appear from the following more detailed description thereof.

The process of the present invention is essentially characterized by the fact that the aluminum hydroxide is generated in situ within the fluid mixture from which the desired separation is to be effected and preferably such generation of aluminum hydroxide takes place during the separatory treatment and in successive stages thereof where a plurality of substances are to be separated in accordance with their specific gravities. More specifically stated, the aluminum hydroxide or settling agent is produced electrolytically by the passage of an electric current between aluminum electrodes immersed in the liquid mixture undergoing treatment. Where only two electrodes are employed, one takes the form of an anode with the application of positive electricity thereto while the other constitutes a cathode to which negative electricity is supplied. In the event that a plurality of pairs of electrodes are employed, the alternate electrodes are made the anodes with the cathodes positioned therebetween.

The process of my present invention finds general application and utility in the various arts where it is desired to separate substances from liquids, among which uses may be mentioned the precipitation of solids carried by liquids in admixture therewith, in suspension, or even in solution; the precipitation of certain forms of bacteria held in liquid suspension; to lessen the hardness of water containing alkali and other compounds which require separation for the purpose of softening the water; to hasten or accelerate the dehydration of blood by separating the hemaglobin from the liquid; to precipitate and stratify metals from aqueous mixtures of simple and complex ores as well as to effect such separation in accordance with the specific gravity of the different metals contained in the ores; the treatment and purification of malt liquors, distilled liquors, sewage, and liquids containing silver nitrate; and in general the process finds application in the separation of all substances, either organic or inorganic or both, held in suspension, colloidal condition, or in solution in a liquid.

Inasmuch as at the present time my process finds its greatest commercial utility in the separation of metals from their ores by the wet method, the process will be described specifically with respect to the treatment of such materials and in this connection the process may be employed upon simple and complex ores containing precious metals as gold, silver, platinum, etc., and upon simple and complex ores containing semi-precious metals as lead, copper, etc. However, it is to be understool that the invention is not limited to the treatment of any specific liquid mixtures as the process is one of general application as above explained.

In the separation of metals from their ores, the process in its broadest aspect comprises the production of aluminum hydroxide in situ within an aqueous mixture of ore from which the desired precipitation is to be effected, the settling of the thus generated aluminum hydroxide through the liquid mixture hastening and accelerating the separation of the metals. As a means for best generating the settling or precipitating agent in situ, I pass an electric current of varying intensity, either alternating or direct, of single, double, triple or polyphase between an aluminum anode and an aluminum cathode immersed in or covered by the aqueous ore mixture being treated. In some instances the liquid may be first treated for the production of aluminum hydroxide therein, the substance to be precipitated in stratas added to the thus treated liquid, and the precipitate caused to separate in any suitable separatory apparatus.

Although I do not intend to limit my invention to any particular theory of operation, I believe that when an electric current is passed from one aluminum electrode to another through a liquid having a high water content, the water is hydrolyzed into hydrogen ions and hydroxy ions and aluminum is given off at one of the electrodes which combines with the hydroxy ions to form an aluminum hydroxide. This compound possesses excellent precipitating properties which, combined with the ionization of the substances contained in the liquid, hastens and accelerates the precipitation and ultimate stratification of the substances which it is desired to separate from the liquids undergoing treatment.

Although the foregoing represents the broad concept of our invention with respect to the treatment of ores, in a commercial adaptation of the process I employ a concentrating table somewhat similar to those now in use for the separation of metals from ores by the wet method. In this manner I derive all the benefits attainable from the agitation furnished by the concentrating table which is customarily provided with suitable reciprocatory mechanism. In concentrating tables now in use, the forward and back "kick" of the table, in conjunction with its side tilt and the cross transverse of the water flow thereover, assisted by the usual riffles, acts continuously through opposing forces upon the aqueous ore mixture along the path of longest travel on the table. The result is a constant separation of values from the gangue while the ore mixture is flowing across the table.

However, the concentrating table of my present invention, as preferably employed in the wet separation of metals from ores, differs essentially from known devices in that the spaced riffles on the table top, instead of being made of wood, are formed of aluminum which are connected at the head of the table to a source of electric current in such a manner that positive and negative electricity will be supplied to alternate riffles to thereby constitute the alternate riffles anodes and cathodes between which the current may flow through the aqueous ore mixture. The aqueous mixture of ore is caused to flow in the usual manner across the table over the successive pairs of aluminum anode and cathode riffles and by the passage of current therebetween, aluminum hydroxide is formed in the mass as above explained and in contact with the metals to be separated. The precipitation and separation is materially facilitated and accelerated by the presence of the aluminum hydroxide and the metals deposit in the spaces between the successive alumium electrode riffles in accordance with their specific gravities from which spaces they are removed in the usual manner and collected in suitable storage receptacles.

In the preferred construction of my concentrating table, there is the further distinction from known devices in that the riffles are arranged in a reverse order to that customarily followed. That is to say, in the present construction of concentrating tables the shortest riffles are placed adjacent the top or supply edge of the table and progressively increase in length toward the flow side of the table, whereas in my device the longest riffles are disposed adjacent the ore supply edge of the table and the length of the riffles progressively decreased toward the discharge edge of the table. The reason for such reversal in the disposition of the riffles lies in the fact that by reason of the generation of aluminum hydroxide in the mass undergoing treatment the metal values are thrown down or gravitated almost instantly upon contact with the settling agent generated in situ which is constantly being produced across the table and the values begin at once to gravitate and separate according to their specific gravities. Since the full wash end of the table top is available to further the separating process to greater perfection than has heretofore been proposed, it will be seen that the progressive decrease in length of the riffles from the supply end to the discharge end of the table in conjunction with the production of aluminum hydroxide in situ tends to throw down the values at the top edge of the table so that many of the metals are separated, recovered, and washed off the table without, as is commonly the case, continuing on down the table to be mixed with other metals to form a concentrate which in turn requires additional separatory treatment. The advantage of such a rapid and complete separation of the metals is clearly apparent and the process is carried out at such low cost as to make it commercially practicable.

In order to afford a fuller understanding of the concentrating table forming part of my invention, I have illustrated in Fig. 1 of the accompanying drawings a top plan view thereof, the reciprocating mechanism, collecting receptacles, and other appurtenances being omitted since they form no part of the present invention; while in Fig. 2 I have shown a longitudinal sectional view through one of the aluminum electrode riffles secured to the table top.

Referring more particularly to the drawings, A indicates generally the concentrating table having feed box or distributor B provided with discharge spouts C. To the table top are secured, as by means of screws 10, the alternately disposed aluminum anode riffles a and the aluminum cathode riffles c, the longer riffles being positioned adjacent the supply edge of the table and the shorter ones adjacent the discharge edge thereof as shown in Fig. 1. As indicated in Fig. 2, the riffles taper slightly toward the far ends thereof and their opposite ends are flanged as shown at 11 and abut against side wall 12 of the table. Set screws 13 of conductive material are positioned in aligned openings in flanges 11 and side wall 12, the anode riffles a and cathode riffles c being connected respectively through positive and negative lead lines 14 and 15 to any suitable source of electricity 16, all as diagrammatically illustrated in the drawings. The table top will of course be inclined in the usual manner.

In operation, the aqueous mixture of pulverized ore is continuously fed to the table from distributor B and flows across the table and over the riffles as in known constructions. Simultaneously suitable electric current is supplied to the aluminum anode and cathode riffles a and c from the source 16, this action resulting in the continuous generation of aluminum hydroxide within the liquid mixture flowing across the table and its presence hastening or accelerating the separation of the metals from the gangue, the metals depositing between the riffles according to their specific gravities, all as heretofore explained. As an example, in the treatment of a specific ore, gold would concentrate in space 1, lead in space 2, copper in space 3, iron in space 4, zinc in space 5, and middlings in space 6 while the gangue would flow across a zone intermediate the sides of the table and discharge over the lower edge thereof. The concentrates are removed from the spaces between the riffles in the customary manner and discharged into suitable collecting receptacles and treated for the separation of the aluminum hydroxide therefrom.

However, such separation is not essential since the amount of aluminum hydroxy compound which may adhere to the precipitates is so infinitesimal as to make no appreciable difference in the desired purity of the concentrates. The aluminum electrodes are disintegrated very slowly by the electric current so that the amount of resultant aluminum hydroxide is very slight in proportion to the volume of liquid undergoing treatment and hence separation of the compound from the concentrates is unnecessary except in exceedingly rare cases. For all practical purposes a separation need not be made.

Having described my invention, I claim:

1. An apparatus of the class described comprising a concentrating table, means for supplying ore and water to one end of said table, spaced aluminum riffles on said table, said riffles being of progressively shorter length from the supply end of said table to the opposite end thereof, and means for passing an electric current between said riffles.

2. A method for separating metals of different specific gravities from an aqueous mixture thereof which comprises flowing the mixture substantially transversely over a plurality of spaced aluminum riffles, simultaneously passing an electric current between adjacent riffles, recipitating the metals according to their specific gravities in the successive spaces between the riffles, and removing the precipitated metals from said spaces.

3. A method for separating solids of different specific gravities from an aqueous mixture thereof which comprises flowing the mixture substantially transversely over a plurality of spaced aluminum riffles, simultaneously passing an electric current between adjacent riffles, precipitating the solids according to their specific gravities in the successive spaces between the riffles, and removing the precipitated solids from said spaces.

4. A method for separating solids from a liquid which comprises supplying a mixture of the solids and liquid to a concentrating table provided with a plurality of spaced aluminum riffles, flowing the mixture from the supply end of the table toward the opposite end thereof substantially transversely over the riffles while passing an electric current between the riffles and thereby collecting the solids between the riffles, and discharging the solids from between the riffles over a side of the table.

5. A method for separating metals of different specific gravities from an aqueous mixture thereof which comprises supplying the mixture to one end of a concentrating table provided with a plurality of spaced aluminum riffles and flowing the same toward the opposite end of the table substantially transversely over said riffles, simultaneously passing an electric current through the riffles and depositing the metals according to their specific gravities in the successive spaces between the riffles, and flowing the metals out of said spaces over a side of the table.

6. An apparatus of the class described comprising a concentrating table, means for supplying a mixture of solids and liquid to one end of the table to flow toward the opposite end thereof, a plurality of spaced aluminum riffles on said table and disposed in substantially parallel relation to the ends of the table, means for supplying electric current to said riffles, and means for discharging solids over a side of the table from the spaces between said riffles.

7. An apparatus of the class described comprising a concentrating table, means for supplying a mixture of solids and liquid to one end of the table to flow toward the opposite end thereof, a plurality of spaced aluminum riffles on said table and disposed in substantially parallel relation to the ends of the table, said riffles being tapered at one end thereof, means for supplying electric current to said riffles, and means for discharging solids from the spaces between said riffles over the side of the table closest to the tapered ends of the riffles.

In testimony whereof I affix my signature.

DAVID M. TILLER.